US006623038B2

United States Patent
Heem

(10) Patent No.: US 6,623,038 B2
(45) Date of Patent: Sep. 23, 2003

(54) AUTOMATIC LIFTING MUD FLAP ASSEMBLY

(75) Inventor: Kenneth Heem, Aurora, MN (US)

(73) Assignee: James Field, Farmington, NM (US); part interest (*) Notice: Subject to any disclaimer, the term of this patent is extended or adjusted under 35 U.S.C. 154(b) by 0 days.

(21) Appl. No.: 09/735,661

(22) Filed: Dec. 14, 2000

(65) Prior Publication Data

US 2002/0074790 A1 Jun. 20, 2002

(51) Int. Cl.[7] .............................. B62D 25/18; B60P 1/00
(52) U.S. Cl. ....................... 280/848; 280/851; 280/847; 298/1 SG
(58) Field of Search ................................ 280/851, 848, 280/847, 154, 157, 159; 298/1 SG; 254/286, 385, 386; 212/250

(56) References Cited

U.S. PATENT DOCUMENTS

| 2,415,907 A | * | 2/1947 | Pierce ......................... 212/250 |
| 2,981,553 A | | 4/1961 | Zerbe, Sr. ................. 280/154.5 |
| 3,203,710 A | | 8/1965 | Harting, Jr. .............. 280/154.5 |
| 3,582,109 A | | 6/1971 | Moore ...................... 280/154.5 |
| 3,806,196 A | | 4/1974 | Cole et al. ................. 198/1 SG |
| 4,097,090 A | | 6/1978 | Payne et al. .............. 198/15 G |
| 4,124,221 A | | 11/1978 | Goings ................. 280/154.5 R |
| 5,199,742 A | | 4/1993 | Götz et al. ................... 280/851 |
| 5,582,431 A | | 12/1996 | Anderson .................... 280/851 |
| 6,158,775 A | * | 12/2000 | Nickels ....................... 280/847 |

FOREIGN PATENT DOCUMENTS

GB    2140385 A    * 11/1984    .................. 212/250

* cited by examiner

Primary Examiner—Brian L. Johnson
Assistant Examiner—Gerald B Klebe
(74) Attorney, Agent, or Firm—Jacobson Holman PLLC

(57) ABSTRACT

An automatic lifting mud flap assembly for a motor vehicle includes at least two identical flap control boxes or housings. Each box is detachably mounted on the motor vehicle in the location of the mud flap after the standard mud flap is removed, and the mud flap is then mounted on the mounting box using standardized fittings. Lifting bars are detachably attached to the mud flaps adjacent their lower edge. A cable is securely connected inside the box and extends outside the box for connection to the lifting bar. An air cylinder and pulley system inside the housing controls the extent of the cable outside the box, and the air cylinder is operatively connected to the pneumatic system of the vehicle through an electric air valve which retracts or extends the cable, thus raising or lowering the mud flap. The electric air valve can be actuated manually from the vehicle cab or automatically by connection to the rear back up lights to raise the flaps when the vehicle is put into reverse gear.

22 Claims, 2 Drawing Sheets

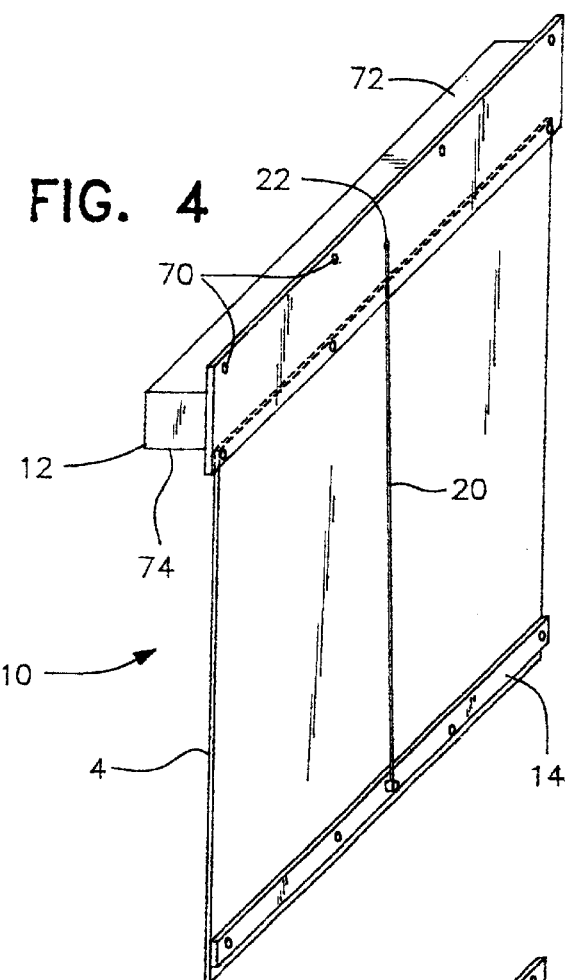
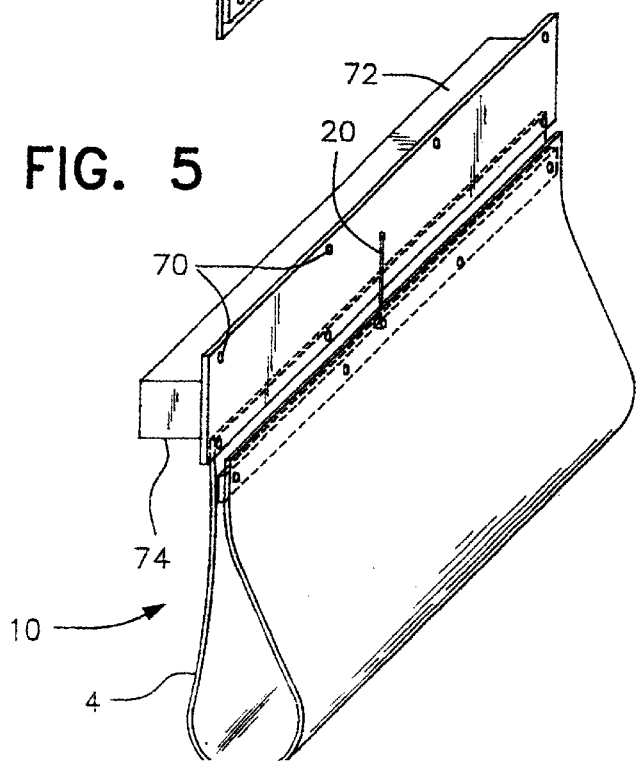

AUTOMATIC LIFTING MUD FLAP ASSEMBLY

BACKGROUND OF THE INVENTION

1. Field of the Invention

The present invention relates to mud flaps for trucks and other transport vehicles. More specifically, the present invention relates to an automatically lifting mud flap assembly.

2. The Prior Art

One of the areas which is highly regulated, and one which can cause a great deal of expense to comply with, is the generally mandatory use of truck wheel or mud flaps. It cannot be denied that mud flaps are required to protect other vehicles and pedestrians. Conventionally, mud flaps are suspended from the truck body rearwardly of the rear truck wheels to prevent mud, stones or other debris material from being thrown or rearwardly ejected from the truck wheels and striking trailing motor vehicles or people. Generally, the mud flaps are merely suspended freely and therefore when the truck is traveling in loose ground or gravel in reverse, the flaps are often torn by coming in contact with the rear tires.

Large truck such as dump trucks used in interstate commerce are required by law to be provided with mud flaps behind each set of rear wheels. Such flaps are required to protect other vehicles and persons from rocks and other debris being rearwardly ejected from the truck wheels. Such flaps often can be torn from the rear of the vehicle when it is backed into some objects or in the case of a dump truck, when the flap is buried by the load being deposited from the dump truck. The resultant lack of a proper mud flap on many vehicles, thus, gives rise to injuries and property damage.

A serious difficulty arises when the required flaps are incorporated behind the rear wheels of dump trucks having tiltable dump beds. Flaps normally mounted on dump trucks are rigidly secured to the truck frame. As a truck discharges its load of sand, gravel or related material, a large pile of the dumped material forms beneath the rear of the vehicle. The material surrounds the flaps on all sides and effectively secures the flaps to the pile. Most flaps are fabricated from a resilient material which can be repeatedly folded or bent, because the flaps are buried in the dumped material. Often great forces are applied to the flaps and their mounting brackets as the forward movement of the truck pulls the flaps from the grip of the dumped material. Over a period of time, the flaps become damaged and rips develop in the flaps or the flaps are ripped from the brackets. The cost to replace the flaps is substantial. Also, there are fines for driving without flaps or with damaged flaps.

The prior art contains various solutions to the problem of damaged flaps. U.S. Pat. No. 2,981,553 to Zerbe, Sr. is an automatic flap system for moving the flaps behind the rear wheels. The patent describes a system which moves the flaps out of the way when the truck is put in reverse gear. The system uses one pulley connected to a single long cable. The long cable connects at the rear of the truck to two shorter cables. These two shorter cables connect to each of the mud flaps. When power is provided, a motor rotates the pulley which in turn pulls the long cable. This cable, elaborately connected to the shorter cables, pulls the flaps up. A pivot point serves as an axis to permit the flaps to pivot upwardly and out of the way. The problem with this system is that it is spread out over the transmission of the truck. It is difficult to install and the long single cable is easily damaged, because of its exposure to the elements. The smaller cables tend to weaken with the tension applied from the larger cable. Additionally, the control box contains an elaborate system of solenoid coils, switches and armature. Another problem is that this is a single system which operates both flaps. Therefore, if the system malfunctions, both flaps are out of service.

In U.S. Pat. No. 3,203,710 to Harting, Jr. and U.S. Pat. No. 3,806,196 to Cole et al, a mud flap retractor is described for a dump truck. The retractor is a mechanical cable system which is bolted to the truck. The cable runs to the body through a front guide and there to the mud flap. When the truck dumps its load, the raising of the body raises the mud flaps. The flaps curl inward and out of the way of the load being dumped. The Harting, Jr. patent has to have specially designed mud flaps, and the Cole et al patent adds a long heavy pipe which is fixedly connected to both flaps. A common problem with these type of retractors is that the mud flaps are in the down position when the truck is traveling in reverse. Thus, the wheels can catch the mud flaps and still cause tearing or ripping.

U.S. Pat. No. 3,582,109 to Moore is a mud flap retraction apparatus. Metal strips are affixed to the bottom of the mud flaps to protect the bottom of the flaps. These metal strips also secure a cable in the center of each strip. The cable extends upwardly along the outside surface of the mud flap and through an aperture in the bed of the truck body. A metal conduit receives each cable and converges into a V-shaped structure wherein the two cables connect to a single cable. The common cable connects to a lever arm and piston.

The lever arm is pivotally secured at one end and coupled to a rod of the piston in the center thereto. A solenoid valve switching circuit controls an air storage tank and compressor to pump air into a cylinder which in turn pushes the piston out. When the piston extends out of the cylinder, the lever arm is pushed towards the rear of the truck. This releases the flaps simultaneously and the flaps fall into the down position. To retract the flaps, the switching circuit is activated which results in the air being removed from the cylinder. This in turn allows the piston to be disposed in the cylinder. The movement of the piston forces the lever arm to move toward the front of the truck. The lever arm pulls on the cable which simultaneously pulls on each of the cables attached to the respective flap. The flaps begin to retract and are fully retracted when the piston rests in the cylinder. The system of this patent is a single system which has to be mounted to the body of the truck. With only one air cylinder and piston controlling both flaps. the system is prone to malfunctioning.

U.S. Pat. No. 4,097,090 to Payne et al discloses another flap retraction system. The system is attached to the dump box of the truck rather than to the body. More specifically, the system is attached to the tailgate of the dump box. Each flap is sandwiched between a pair of rectangular shaped metal plates. Additionally, each flap is attached to a separate bracket and piston system. The retraction of the flaps only occurs when the dump box is dumping. Here, the specially designed flaps are expensive and cumbersome, and the system is complex and difficult to install.

In U.S. Pat. No. 5,582,431 to Anderson, still another retractable mud flap assembly for a motor vehicle is described. The assembly includes an enclosure to receive the flap and a downwardly curved lip for guiding the flap into the assembly. A scrapper is attached near the lip to scrap the wheel side of the flap when retracted, in an attempt to remove debris such as mud and rocks which will clog and damage the assembly. A linear actuator is provided for each flap to retract and extend the respective flap based on a control lever mounted in the cab. The linear actuator can also be configured to retract the flaps whenever the vehicle is placed in reverse. While the assembly eliminates the springs and cables of other prior art systems, it still must utilize special mud flaps and complex mounting procedures under the cargo box of the truck. Thus, the assembly is expensive and difficult to install.

SUMMARY OF THE INVENTION

In order to overcome the problems and disadvantages of the prior art mud flap retraction assemblies, the present invention takes advantage of the standardization of the size and shape of mud flaps according to the regulations of the U.S. Department of Transportation. The present invention provides a dual automatic mud flap lifting assembly which mounts separately adjacent each set of rear wheels. The assembly is easy to install and is simple in operation. The operator removes each existing mud flap and mounts an elongated control housing in the existing area of the removed flap. The flap is then reattached along the bottom of the installed housing. A metal lifting bar is attached to the lower end of each flap and a cable extending from the housing is securely attached to an eye hook or other mounting element of the lifting bar.

More specifically, the elongated mounting box is in the shape of a long rectangular box which has upper and lower mounting edge plates that extend from the top and bottom at the back of the housing or box. Both mounting edge plates have holes spaced longitudinally therealong which match the standard size and spacing for the mounting holes of the mud flaps. Hence, the elongated control housing can be mounted directly on the truck body by the upper mounting edge plate at the location where the mud flap has been removed. The mud flap can then be reattached onto the elongated control housing along the lower mounting edge plate.

The cable which raises and releases the mud flap is actuated preferably by a simple air cylinder and cable pulley assembly housed inside the elongated mounting box or housing. Appropriate air lines connect the air cylinder through a conventional electric air valve to the pneumatic system typically installed on the truck or transport vehicle, and an electric control at the vehicle dashboard is electrically connected to the air valve for manually actuating the cylinder to an extended or retracted position. When the air cylinder is actuated to extend the actuating rod, the cable pulley system causes the cable to retract into the mounting box thus automatically raising the mud flap. When the air cylinder is actuated to retract the actuating rod, the cable pulley system allows the cable to be played out of the mounting box thus permitting the mud flap to extend downward to its normal extended position. In addition, the electric air valve is preferably wired to the back up lights at the rear of the vehicle so that the air cylinder is automatically actuated to raise the mud flaps when the vehicle transmission is put into reverse.

In accordance with the foregoing, it is an object of the present invention to provide at least two control boxes, each box being detachably mounted on the rear portion of a motor vehicle for separately raising and lowering the mud flaps.

It is a further object of the present invention to provide each control box with a top edge having standardized means for attaching the control box to the rear portion of the motor vehicle, and a bottom edge having standardized means for reattaching the mud flap to the bottom edge of the control box.

Another object of the present invention is to provide an air cylinder and cable pulley system mounted inside the control box for raising and lowering the bottom edge of the mud flap.

A further object of the present invention also is to provide a T-arm rigidly mounted to the outer end of the air cylinder which has at least two pulleys of the pulley system rotatably mounted thereon with a third pulley rotatably connected to the box at a predetermined location which plays out and reels in the cable during alternate reciprocation of the air cylinder actuating arm.

Still a further object of the present invention is to provide an electric air valve connected to the air cylinder for supplying air to the air cylinder from the standard pneumatic system of the truck or other vehicle.

Yet another object of the present invention is to provide a control system electrically connected to the electric air valve and back up lights of the motor vehicle, with a switch electrically connected to the control system for manually switching the control system; and means for illuminating in the vehicle control panel the position of the mud flap.

Yet still another object of the present invention is to provide an automatic lifting mud flap assembly in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a perspective view of the automatic lifting mud flap assembly according to the present invention with the mud flap in the down or extended position.

FIG. 5 is a perspective view of the automatic lifting mud flap assembly according to the present invention with the mud flap raised in the up or retracted position.

DETAILED DESCRIPTION OF THE INVENTION

Figure 1:
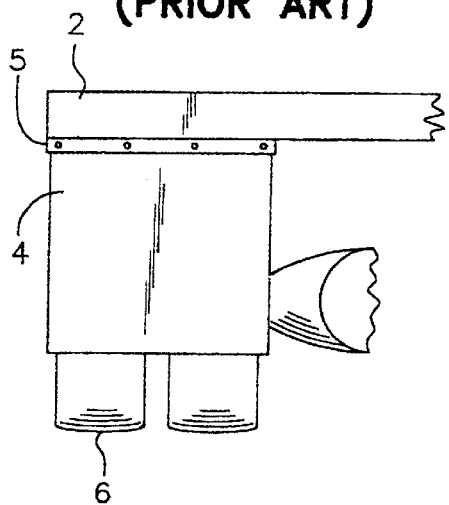
FIG. 1 is a rear view of a partial truck with a standard mud flap installed thereon.

Although only one preferred embodiment of the invention is explained in detail, and it is to be understood that the embodiment is given by way of illustration only. It is not intended that the invention is to be limited in its scope to the details of construction and arrangement of components set forth in the following description of illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

FIG. 1 illustrates a rear view of a truck 2 having a standard resilient mud flap 4 attached thereto in the standard mud flap holes 5 covering or protecting the rear tires 6 from debris or other elements being rearwardly ejected from striking other vehicles or persons. The standard mud flap 4 typically extends within approximately 20 inches from the ground.

Figure 2:
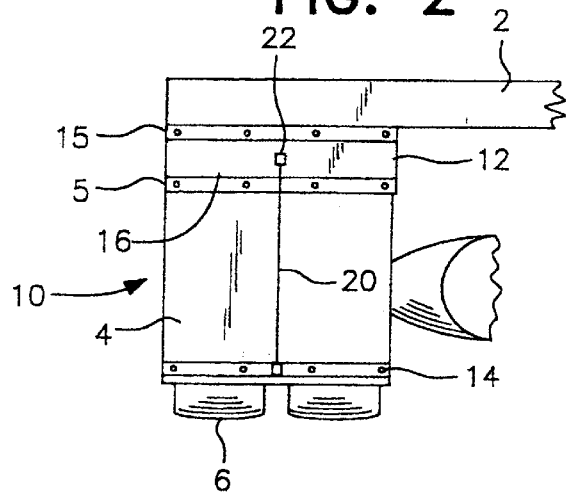
FIG. 2 is a rear view of a partial truck on which an automatic lifting mud flap assembly of the present invention is mounted along with the standard mud flap.

FIG. 2 illustrates the automatic lifting mud flap assembly of the present invention, generally designated by reference numeral 10, as attached to the truck 2, in the same configuration of the truck 2 as shown in FIG. 1. When installed, a separate mud flap assembly 10 is utilized for each set of wheels 6 at the rear of the vehicle. However, for simplicity's sake, only one such assembly is shown and described.

The mud flat lifting assembly 10 consists of an elongated rectangular mounting box or housing 12 which has an upper mounting edge plate 15 which extends from the upper wall 72 at the rear of box 12. The upper mounting edge plate 15 has holes 70 which align with the existing mud flap holes 5 so that the assembly 10 can be simply bolted onto the existing mud flap holes 5 by the upper mounting plate 15. There are no changes which need to be made to mount the box 12 to the truck or other vehicle. By easily removing the standard mud flap 4 from its mountings 5, the flap mounting box 12 is mounted in the same holes or mountings 5 of the removed mud flap 4. This is possible because mud flaps are now standard size and shape according to U.S. Department of Transportation regulations. The flap mounting box 12 is designed to fit into the same position as the removed flap 4.

Extending from the bottom wall 74 of the housing or box 12 is a lower elongated mounting edge plate 16 similar to the upper mounting plate 15. After the flap mounting box 12 is mounted to the vehicle through the upper mounting plate 15, the removed mud flap 4 is attached to the lower mounting plate 16. The bottom plate 16, similar to the top plate 15, has identical holes or mountings to receive the mud flap 4. The lift bar 14 is then attached to the mud flap 4 adjacent the bottom of the flap so that it preferably extends horizontally across the flap 4. The addition of the box 12 extends the mud flap 4 closer to the ground. This has an added benefit of safety. There is now additional coverage of the tires 6 which further protects other vehicles and persons from rocks or other debris which may be ejected from rotation of the truck tires.

A cable 20 extends from an aperture 22 in the center of the flap mounting box 12. The cable 20 lays nearly the entire length of the flap 4 and is securely attached to the bar 14 at the bottom of the mud flap 4 by any suitable attaching mechanism. This cable 20 is utilized to control the upward movement or retraction of the flap 4 and typically is about 30 inches in length.

Figure 3:
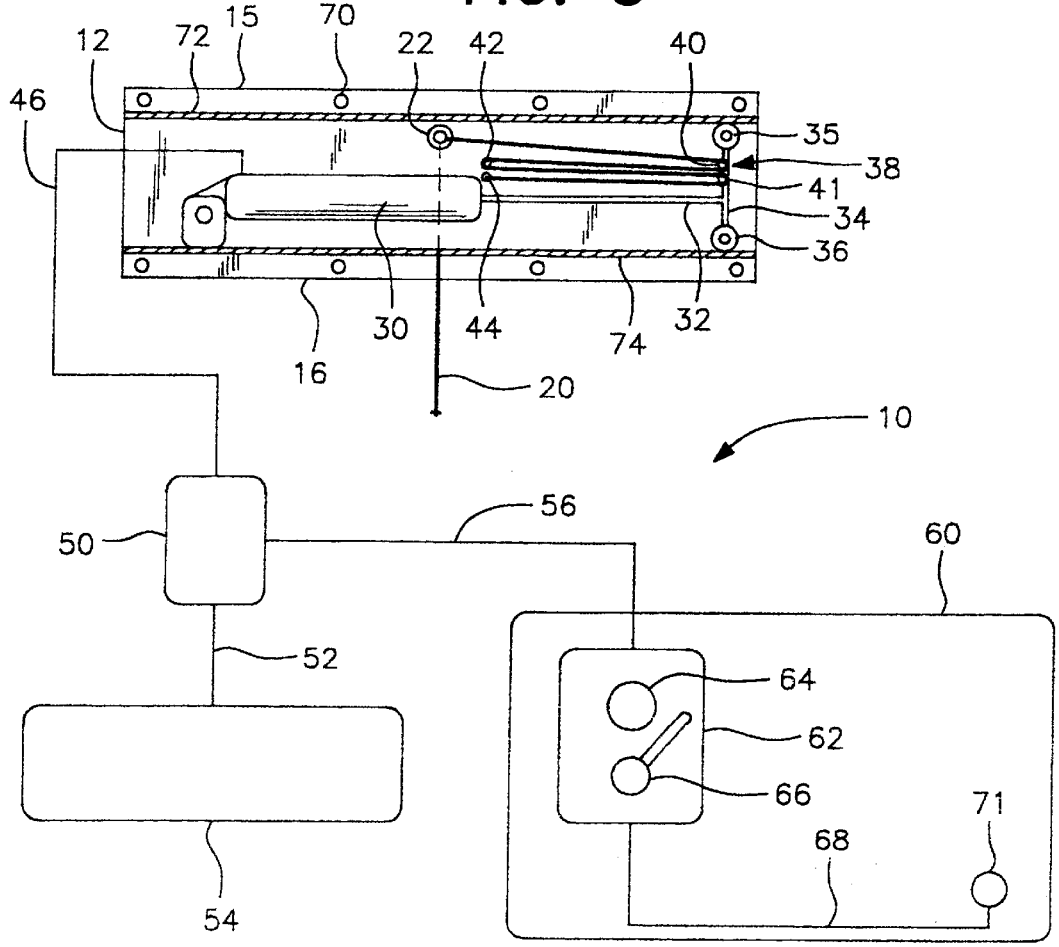
FIG. 3 is a schematic drawing of the operating components of the automatic lifting mud flap assembly of the present invention.

FIG. 3 shows a schematic illustration of the automatic lifting mud flap assembly 10 of the present invention with the back wall removed and the top and bottom walls shown in cross-section for illustration purposes. The top mounting edge plate 15 and bottom mounting edge plate 16 are shown with the exposed holes or mountings that align with the holes 5 of the standard mud flap 4. Mounted inside the box 12 is an air cylinder 30 with a movable actuating rod 32. The rod 32 has a perpendicularly extending arm 34 rigidly attached at its outer end, thus forming a T-shape for the attached arm 34 and rod 32. At the outer ends of arm 34 are a set of rollers 35, 36. The upper roller 35 rolls horizontally along the inside surface of top wall 72 of the housing 12. The bottom roller 36 moves or rolls horizontally along the inside surface of the bottom wall 74 of the housing 12

Attached to the T-arm 34 and rod 32 is a pulley system, generally designated by reference numeral 38, which guides the cable 20. The pulley system 38 preferably includes at least three pulleys 40, 41, 42 with two pulleys 40 and 41 attached to the T-arm 34 and the third pulley 42 attached at a fixed point in the box 12. The inside end of cable 20 extends from a similar fixed point 44 near the third pulley 42 and proceeds through the pulley system. More specifically, the cable 20 extends around the bottom pulley 41 of the pulleys on the T-arm 34, and then wraps around the third or fixed pulley 42. The cable 20 then returns back to the top pulley 40 on T-arm 34. After extending around this pulley 40, the cable 20 proceeds out the box 12 through the center aperture 22. The cable 20 travels nearly the length of the flap 4 and connects to the lift bar 14. An eye hook or other suitable attaching means for connecting the cable to the bar can be used.

During the operation of the assembly 10, or when the mud flap 4 is retracted, the actuating rod 32 is in its fully extended position. At this time, the majority of the cable 20 will be inside the box. Conversely, when the actuating rod 32 is retracted, the majority of the cable 20 is outside of the box 12.

The air cylinder 30 is operated by an air line which extends to an electric air valve 50. The air valve 50 is attached to another slightly larger air line 52 which is connected to an air tank 54 which is typically already installed on the truck or other vehicle as part of the pneumatic system of the vehicle. Additionally, the electric air valve 50 is connected to a control wire 56 which leads to the dashboard 60 of the truck 2. On the dashboard 60 is a control panel 62. The control panel 62 includes a red light 64 and a switch 66. A subsequent wire 68 is connected to the switch 66 and back up lights 71 of the truck 2 so that when the truck 2 is put in reverse or the driver flips the switch 66, the red light 64 will go on indicating that the flaps 4 are up or in the retracted position. When the flaps 4 are in the normal down or extended position, the red light 64 is off.

FIG. 4 illustrates a perspective view of the flap mounting assembly 10 with a standard mud flap 4 attached. The bar 14 is connected and extends generally horizontally on the lower portion of the flap 4. Connecting the lift bar 14 to the box 12 is the cable 20 which is utilized to release the bar 14 thus placing the flap 4 in the down or extended position. The flap 4 can be placed in this down position only by using the switch 66.

The retracted or up position of the mud flap 4 by the lifting assembly 10 is illustrated in FIG. 5. In this retracted position, the flap 4 is saved from being torn or ripped. In operation, the air cylinder 24 is actuated, thus extending actuating rod 32 and drawing cable 20 into the housing over pulley assembly 38. The cable 20 thus pulls on lift bar 14 and raises the bottom portion of the flap 4 to be curled and out of the way of debris, dirt, stones or other materials. When either the switch is moved or the truck is shifted out of reverse, the air cylinder causes the actuating drum 32 to retract, thus releasing cable 20 to allow the flap 4 to fall by gravity to its down or normal driving condition.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An automatic lifting mud flap assembly for a motor vehicle, said motor vehicle having rear wheels, back up lights and mud flaps attached to a rear portion of said vehicle for covering said wheels and deflecting rearwardly projected road materials from said wheels, said assembly comprising:

at least two identical flap mounting boxes, each being detachably mounted on said rear portion of the motor vehicle in place of the mud flaps, said mud flaps being mounted on a respective one of said boxes;

a lift bar detachably connected to each said mud flap adjacent a lower edge thereof;

a cable having two ends and a predetermined length, one end being securely connected inside said box at a predetermined location, said cable extending out from said box and said other end of said cable being securely connected to said lift bar;

an air cylinder and pulley system mounted in said box for controlling the extension of said cable;

a rod with a T-arm for moving in and out of said air cylinder;

a top roller mounted to said T-arm of said rod for moving in rhythm with said rod on said flap mounting box; and a bottom roller mounted to said T-arm of said rod for moving in rhythm with said rod on said flap mounting box.

2. The automatic lifting mud flap assembly as recited in claim 1, wherein said flap mounting box includes:

top means for attaching said flap mounting box to said rear portion of said motor vehicle, bottom means for attaching the mud flap to said bottom portion of said flap mounting box, an electric air valve connected to said air cylinder for controlling air into and out of said air cylinder;

an air tank connected to said electric air valve for supplying the air to said air cylinder;

a control system electrically connected to said electric air valve and the back up lights of said motor vehicle;

a switch electrically connected to said control system for manually switching said control system; and means for illuminating electrically connected to said switch and the back up lights of the motor vehicle said pulley system having at least two pulleys rotatably connected to said T-arm of said rod, and a third pulley rotatably connected to said box at a predetermined location, and said one end of cable connected to said box near said third pulley, said cable extending to one of said pulleys on said T-arm, around said third pulley, back to said other pulley on said T-bar, and out said aperture of said box, said other end of said cable being securely connected to an eye hook.

3. The automatic lifting mud flap assembly as recited in claim 1, wherein said predetermined length of said cable is thirty inches.

4. The automatic lifting mud flap assembly as recited in claim 2, wherein said control system signals said electric air valve to control said air to said air cylinder.

5. The automatic lifting mud flap assembly as recited in claim 4, wherein said electric air valve receives a first signal from said control system to remove air from said air cylinder and receives a second signal from said control system to supply air to said air cylinder.

6. The automatic lifting mud flap assembly as recited in claim 5, wherein said cylinder pulls said rod into the cylinder when air is removed from said cylinder; and said cylinder pushes said rod out of said cylinder when air is received into said cylinder.

7. The automatic lifting mud flap assembly as recited in claim 6, wherein said rod moves horizontally in said box with said pulley system to adjust the amount of cable in said box.

8. The automatic lifting mud flap assembly of claim 7, wherein said cable adjusts in a retracted position by pulling the attached bar until said flap is curled, and said cable adjusts in an extended position by releasing the attached bar until said flap is straight.

9. An automatic lifting mud flap assembly for a motor vehicle, said motor vehicle capable of moving forward and backward and having front and rear wheels, back up lights and mud flaps attached to a rear portion of said vehicle for covering said wheels and deflecting rearwardly projected road materials from said wheels, said assembly comprising:

at least two flap mounting boxes, each having an aperture and each being detachably mounted on said rear portion of the motor vehicle for replacing the mud flaps, each said flap mounting box including a top portion having means for attaching said flap mounting box to said rear portion of said motor vehicle, a bottom portion having means for attaching the mud flap to said bottom portion of said flap mounting box, an air cylinder, a rod with a T-arm for moving in and out of said air cylinder, a pulley system having at least two pulleys rotatably connected to said T-arm of said rod, and a third pulley rotatably connected to said box at a predetermined location;

a bar having an eye hook, said bar being detachably connected to said mud flap, oriented horizontally and parallel to a general orientation of said box and at a predetermined distance thereto, said eye hook being aligned with said aperture;

a cable having two ends and a predetermined length, said one end being connected to said box near said third pulley, said cable extending to one of said pulleys on said T-arm, around said third pulley, back to said other pulley on said T-arm, and out said aperture of said box, said other end of said cable being securely connected to said eye hook; and two rollers, one of said rollers mounted to a top end of said T-arm and said other roller connected to a bottom end of said T-arm, said top and bottom rollers moving in rhythm with said T-arm to control the extension of said cable.

10. The automatic lifting mud flap assembly of claim 9, comprising:

control system electrically connected to said box and the back up lights of said motor vehicle, said control system detecting when said motor vehicle moves in a forward or reverse direction.

11. The automatic lifting mud flap assembly of claim 9, wherein said top roller rolls on said top portion of said flap mounting box; and said bottom roller rolls on said bottom portion of said flap mounting box.

12. The automatic lifting mud flap assembly of claim 9, wherein said control system further comprising:

an electric air valve connected to said air cylinder of said box for controlling air into and out of said air cylinder;

an air tank connected to said electric air valve for supplying the air to said air cylinder;

a switch electrically connected to said control system for manually switching said control system; and means for illuminating electrically connected to said switch and the back up lights of the motor vehicle.

13. An automatic mud flap lifting assembly for a motor vehicle equipped with standard size mud flaps covering its rear wheels and a pneumatic system for supplying pressurized air to operating components of said vehicle, said lifting assembly comprising:

- a control box for each flap which is mounted to said vehicle in place of said mud flap and which supports said mud flap adjacent a lower edge of said control box;
- a lift bar detachably connected to said mud flap adjacent a lower edge thereof;
- a cable having one end connected inside said box, extending out from said box and having another end connected to said lift bar; and
- an air cylinder, piston rod, and pulley system mounted in said box for controlling the extension of said cable, a top roller and a bottom roller, each mounted to said piston rod, for moving in rhythm with said pulley system inside said control box, said air cylinder operatively connected to said pneumatic system to extend and retract said cable extending outside said control box to lower and raise said lift bar and said mud flap lower edge.

14. The automatic mud flap lifting assembly of claim 13, comprising:

- a switch electrically connected to said control box for manually switching said control box.

15. An automatic lifting mud flap assembly for a motor vehicle which comprises a flap control box detachably mounted on the motor vehicle in a location of a standard mud flap after the standard mud flap is temporarily removed, lifting bars detachably attached to the mud flaps adjacent a lowermost edge, a cable securely connected inside said box and extending outside said box for connecting to said lifting bar, an air cylinder, a piston rod, and pulley system mounted inside said box, said system including a top roller and a bottom roller mounted to the piston rod and moving in rhythm with said system inside said box to control an extent of said cable outside said box, and said system being operatively connected to a pneumatic system of the vehicle through an electric air valve which retracts or extends said cable to raise or lower the mud flap.

16. The automatic lifting mud flap assembly as recited in claim 15, wherein a control system signals said electric air valve to control air to said air cylinder.

17. The automatic lifting mud flap assembly as recited in claim 16, wherein said electric air valve receives a first signal from said control system to remove air from said air cylinder and receives a second signal from said control system to supply air to said air cylinder.

18. The automatic lifting mud flap assembly as recited in claim 17, wherein said cylinder pulls said piston rod into the cylinder when air is removed from said cylinder; and said cylinder pushes said piston rod out of said cylinder when air is received into said cylinder.

19. The automatic lifting mud flap assembly as recited in claim 15, wherein said piston rod moves horizontally in said box with said pulley system to adjust the amount of cable in said box.

20. The automatic lifting mud flap assembly of claim 15, wherein said cable adjusts in a retracted position by pulling the attached lifting bar until said flap is curled, and said cable adjusts in an extended position by releasing the attached lifting bar until said flap is straight.

21. The automatic lifting mud flap assembly of claim 15, and further comprising:

- a control system electrically connected to said box and to the back up lights of said motor vehicle, said control system detecting when said motor vehicle moves in a forward or reverse direction.

22. The automatic lifting mud flap assembly of claim 21, said control system further comprises:

- an electric air valve connected to said air cylinder of said box for controlling air into and out of said air cylinder;
- an air tank connected to said electric air valve for supplying the air to said air cylinder;
- a switch electrically connected to said control system for manually switching said control system; and
- means for illuminating electrically connected to said switch and to the back up lights of the motor vehicle.

* * * * *